United States Patent
Nakano

(10) Patent No.: US 10,963,241 B2
(45) Date of Patent: Mar. 30, 2021

(54) CONTROL APPARATUS, PROGRAM UPDATE METHOD, AND COMPUTER PROGRAM

(71) Applicant: SUMITOMO ELECTRIC INDUSTRIES, LTD., Osaka (JP)

(72) Inventor: Takayuki Nakano, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/341,391

(22) PCT Filed: Dec. 4, 2017

(86) PCT No.: PCT/JP2017/043494
§ 371 (c)(1),
(2) Date: Apr. 11, 2019

(87) PCT Pub. No.: WO2018/142750
PCT Pub. Date: Aug. 9, 2018

(65) Prior Publication Data
US 2019/0361696 A1    Nov. 28, 2019

(30) Foreign Application Priority Data

Feb. 1, 2017 (JP) .............................. JP2017-016539

(51) Int. Cl.
*G06F 8/65* (2018.01)
*G06F 8/654* (2018.01)
(Continued)

(52) U.S. Cl.
CPC .............. *G06F 8/654* (2018.02); *G06F 9/445* (2013.01); *G07C 5/0841* (2013.01)

(58) Field of Classification Search
CPC ................. G06F 8/60; G06F 8/61; G06F 8/65
See application file for complete search history.

(56) References Cited

U.S. PATENT DOCUMENTS 8,813,061 B2 *  8/2014  Hoffman ............. G06F 11/1464
                                              717/168
10,552,143 B2 *  2/2020  Nakano ................... G06F 9/445
(Continued)

FOREIGN PATENT DOCUMENTS

CN         105531676 A      4/2016
JP         2003-058338 A    2/2003
(Continued)

*Primary Examiner* — Duy Khuong T Nguyen
(74) *Attorney, Agent, or Firm* — Baker Botts L.L.P.; Michael A. Sartori

(57) ABSTRACT

Provided is a control apparatus configured to control update of a control program of an on-vehicle control device configured to control a target device installed on a vehicle. The control apparatus includes: a memory configured to store therein update programs for control programs; and a control unit configured to update a plurality of control programs in accordance with update orders set on a plurality of update programs stored in the memory. The control unit executes a determination process of determining whether or not update of the plurality of control programs is to be performed in accordance with the update orders, based on a result of comparison between required update times of the plurality of control programs and a predetermined threshold.

11 Claims, 7 Drawing Sheets

(51) Int. Cl.
*G06F 9/445* (2018.01)
*G07C 5/08* (2006.01)

(56) References Cited

U.S. PATENT DOCUMENTS

| | | | | |
|---|---|---|---|---|
| 10,599,418 | B2* | 3/2020 | Kiyama | .................. H04L 67/10 |
| 2008/0154805 | A1* | 6/2008 | Gurumoorthy | ........... G06F 8/65 |
| | | | | 706/12 |
| 2015/0309784 | A1* | 10/2015 | Molin | .................... F01N 9/002 |
| | | | | 701/71 |
| 2016/0226262 | A1 | 8/2016 | Fukubayashi | |
| 2018/0018160 | A1* | 1/2018 | Teraoka | ................. B60R 16/02 |
| 2018/0081671 | A1* | 3/2018 | Naruse | ................ B60R 16/0231 |
| 2019/0056923 | A1* | 2/2019 | Baba | ......................... G06F 9/48 |

FOREIGN PATENT DOCUMENTS

| | | |
|---|---|---|
| JP | 2007-334471 A | 12/2007 |
| JP | 2011-070307 A | 4/2011 |
| JP | 2012-014253 A | 1/2012 |
| JP | 2012-178035 A | 9/2012 |
| JP | 2014-118071 A | 6/2014 |
| JP | 2016-170740 A | 9/2016 |
| JP | 6009622 B1 | 10/2016 |
| JP | 2016-188016 A | 11/2016 |

* cited by examiner

CONTROL APPARATUS, PROGRAM UPDATE METHOD, AND COMPUTER PROGRAM

TECHNICAL FIELD

The present invention relates to a control apparatus, a program update method, and a computer program.

This application claims priority on Japanese Patent Application No. 2017-016539 filed on Feb. 1, 2017, the entire contents of which are incorporated herein by reference.

BACKGROUND ART

In the automotive field in recent years, vehicles have progressed in functionality, and a diverse range of devices are installed in vehicles. Accordingly, vehicles are equipped with many control devices, so-called ECUs (Electronic Control Units), for controlling these on-vehicle devices.

Each vehicle is equipped with various types of ECUs such as: traveling-related ECUs that control an engine, a brake, an EPS (Electric Power Steering), etc., in response to operations on an accelerator, a brake, and a handle; body-related ECUs that control ON/OFF of interior lights and headlights, sound of an alarm unit, etc., in response to switch operations performed by an occupant; and meter-related ECUs that control operations of meters arranged near the driver's seat.

Generally, each ECU consists of an arithmetic processing unit such as a microcomputer, and implements control of an on-vehicle device by reading out a control program stored in an ROM (Read Only Memory) and executing the read control program. Control programs of ECUs may differ depending on the destinations, grades, and the like of vehicles. Therefore, old versions of control programs need to be overwritten with new versions of control programs in response to version upgrading of control programs.

While a control program of an ECU is being updated, a function to be controlled by the ECU may become unusable. Therefore, update of a control program has to be performed at an appropriate timing.

In order to solve the above problem, various techniques for executing update of a control program at an appropriate timing have been proposed. For example, Patent Literature 1 discloses a technique of monitoring the communication state in a vehicle, and updating a control program in accordance with the communication state. Patent Literature 2 discloses a technique of estimating, based on the schedule of a vehicle, a time period during which the vehicle will not be used, and generating a schedule so as to update a control program in the time period. Patent Literature 3 discloses a technique of determining whether or not a security-related program is updatable, based on the states of a traveling-related device and a steering-related device, and updating the program in accordance with the result of the determination.

CITATION LIST

Patent Literature

PATENT LITERATURE 1: Japanese Laid-Open Patent Publication No. 2012-178035
PATENT LITERATURE 2: Japanese Laid-Open Patent Publication No. 2012-14253
PATENT LITERATURE 3: Japanese Laid-Open Patent Publication No. 2014-118071

SUMMARY OF INVENTION

A control device according to one embodiment is a control apparatus configured to control update of a control program of an on-vehicle control device configured to control a target device installed on a vehicle. The control apparatus includes: a memory configured to store therein update programs for control programs; and a control unit configured to update a plurality of control programs in accordance with update orders set on a plurality of update programs stored in the memory. The control unit executes a determination process of determining whether or not update of the plurality of control programs is to be performed in accordance with the update orders, based on comparison between required update times of the plurality of control programs and a predetermined threshold.

A program update method according to another embodiment is a method for updating a control program of an on-vehicle control apparatus configured to control a target device installed on a vehicle, and the method includes the steps of: storing an update program for a control program in a memory; and updating a plurality of control programs in accordance with update orders set on a plurality of update programs stored in the memory. The step of updating the control programs includes determining whether or not update of the plurality of control programs is to be performed in accordance with the update orders, based on comparison between required update times of the plurality of control programs and a predetermined threshold.

A computer program according to still another embodiment is a computer program for causing a computer to function as a control apparatus configured to control update of a control program of an on-vehicle control device configured to control a target device installed on a vehicle. The computer has a memory configured to store therein update programs for control programs. The computer program causes the computer to function as a control unit configured to update a plurality of control programs in accordance with update orders set on a plurality of update programs stored in the memory. The control unit executes a determination process of determining whether or not update of the plurality of control programs is to be performed in accordance with the update orders, based on comparison between required update times of the plurality of control programs and a predetermined threshold.

DESCRIPTION OF EMBODIMENTS

Figure 1:
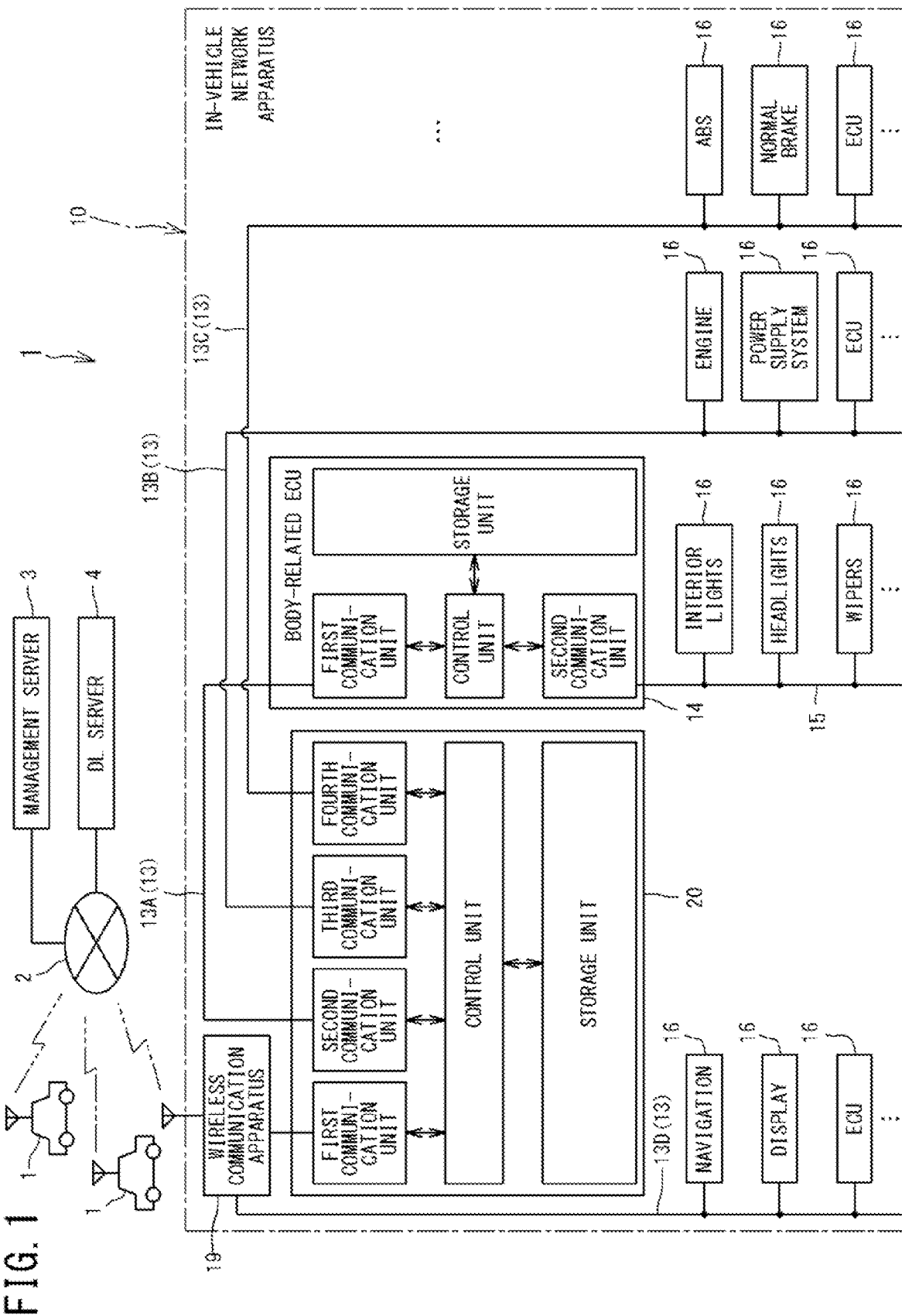
FIG. 1 is a diagram showing an overall configuration of a program update system according to an embodiment.

Problems to be Solved by the Present Disclosure

Since many ECUs are installed on a vehicle, a plurality of control programs to be updated may be present. The plurality of control programs are to be updated in the order of notification to the vehicle. At this time, if the techniques of Patent Literatures 1 to 3 described above are used, an appropriate timing is determined for an earliest control program in a set update order, and the control program is updated at this timing. As for subsequent control programs, appropriate timings are sequentially determined, and the control programs are sequentially updated at the timings. Therefore, if update of a preceding control program is delayed, update of a subsequent control program is also delayed, resulting in delay in completion of update of all the control programs. That is, the control programs are updated at the appropriate timings in accordance with the set update order, without adjusting the update order.

For example, it is assumed that a control program to be updated is a control program of an ECU whose control target (i.e., a function to be controlled by the ECU) is a function to be implemented by a plurality of devices being complexly linked with each other. Such an ECU corresponds to an ECU whose control target is a control-related system. When update of the control program is performed, the power supply for the system of the whole vehicle needs to be temporarily turned off, or use of other devices needs to be suspended.

Meanwhile, it is assumed that a control program to be updated is a control program of an ECU whose control target is a function to be implemented by a single device. Such an ECU corresponds to an ECU whose control target is an application of a navigation device, a display, or the like. When update of the control program is performed, use of the corresponding device needs to be temporarily stopped. However, use of other devices need not be suspended, and the power supply for the system of the whole vehicle need not be tuned off.

In the case where the control program to be updated is the former control program, timing to update the control program is determined based on the use states of a plurality of devices or the use state of the system of the whole vehicle, according to the techniques disclosed in Patent Literatures 1 to 3. Therefore, the update timing may be delayed. On the other hand, in the case where the control program to be updated is the latter control program, since timing to update the control program is determined based on the use state of the single device that implements the function to be controlled by the ECU, delay in the update timing is less likely to occur than in the case of the former control program.

However, in the case where there are a plurality of control programs to be updated and the former control program is updated prior to the latter control program, delay in update of the former control program may cause delay in update of the latter control program that follows. That is, if update of the plurality of control programs is performed according to the set update order without adjusting the update order, update of all the control programs may be delayed. Further, in the case where programs for update remain stored in ECUs or devices on a relay path and memory resources have no margins, the programs for update may adversely affect functions such as a relay function.

An object in one aspect of the present disclosure is to provide a control apparatus, a program update method, and a computer program which allow, when update of a plurality of control programs is performed, each control program to be updated at an appropriate timing.

Effect of the Disclosure

According to this disclosure, when update of a plurality of control programs is performed, each control program can be updated at an appropriate timing.

DESCRIPTION OF EMBODIMENTS

Embodiments of the present invention include at least the following.

That is, a control apparatus included in the embodiments is a control apparatus configured to control update of a control program of an on-vehicle control device configured to control a target device installed on a vehicle. The control apparatus includes: a memory configured to store therein update programs for control programs; and a control unit configured to update a plurality of control programs in accordance with update orders set on a plurality of update programs stored in the memory. The control unit executes a determination process of determining whether or not update of the plurality of control programs is to be performed in accordance with the update orders, based on comparison between required update times of the plurality of control programs and a predetermined threshold. Since the control unit executes the determination process of determining whether or not update of the plurality of control programs is to be performed in accordance with the update orders set on the plurality of update programs, update of the plurality of control programs can be altered according to the result of the determination.

In one example, as for a control program for which the result of the determination process is negative, the control unit stores an update program corresponding to this control program in the memory, and resets the update order of the update program to be later than the previously set update order thereof. Thus, as for a control program for which the result of comparison between the required update time and the predetermined threshold is a predetermined result of comparison, the update order thereof in the update order becomes later than the previously set update order thereof, that is, update of the control program is postponed to be later than update of other control programs. Thus, update of the plurality of control programs can be efficiently performed.

In another example, as for a control program for which the result of the determination process is negative, the control unit deletes the update program corresponding to this control program from the memory. Thus, the update program of the control program, for which the result of the determination process is negative, that is, which has not been determined to be updated according to the update order thereof, is deleted from the memory. Therefore, the update program is not retained in the memory until the update is executed. That is, the memory is prevented from being cluttered with the update program for the control program that is not updated according to the update order thereof.

Preferably, when the required update time is longer than the predetermined threshold, the control unit determines the result of the determination process to be negative.

Thus, regardless of the update orders set on the plurality of control programs, update of a control program whose required update time is within the threshold is preferentially performed, while update of a control program whose required update time is longer than the threshold is postponed. Therefore, update of more control programs can be completed within a shorter time period.

Preferably, when the required update time is longer than the predetermined threshold and user authentication is successful, the control unit determines the result of the determination process to be negative.

Thus, an authorized user, such as the owner of the vehicle, can manage update of the control programs.

Preferably, when the required update time is shorter than the predetermined threshold, the control unit determines the result of the determination process to be negative.

Thus, regardless of the update orders set on the plurality of control programs, update of a control program whose required update time is longer than the threshold is preferentially performed, while update of a control program whose required update time is shorter than the threshold is postponed. Therefore, when update of control programs can be performed over a long period, update of a control program whose required update time is long can be preferentially performed.

Preferably, when the required update time is shorter than the predetermined threshold and user authentication is successful, the control unit determines the result of the determination process to be negative.

Thus, an authorized user, such as the owner of the vehicle, can manage update of the control programs.

Preferably, the control unit is allowed to select between determining the result of the determination process to be negative when the required update time is longer than the predetermined threshold, and determining the result of the determination process to be negative when the required update time is shorter than the predetermined threshold.

Thus, the update orders set on the plurality of control programs can be flexibly changed in accordance with individual situations.

Preferably, the predetermined threshold is variable.

Thus, the update orders set on the plurality of control programs can be flexibly changed in accordance with individual situations.

A program update method included in the embodiments is a method for updating a control program of an on-vehicle control apparatus configured to control a target device installed on a vehicle. The method includes the steps of: storing an update program for a control program in a memory; and updating a plurality of control programs in accordance with update orders set on a plurality of update programs stored in the memory. The step of updating the control programs includes determining whether or not update of the plurality of control programs is to be performed in accordance with the update orders, based on comparison between required update times of the plurality of control programs and a predetermined threshold.

Since the step of updating the control programs includes determining whether or not update of the plurality of control programs is to be performed in accordance with the update orders set on the plurality of control programs, there may be cases where update of the plurality of control programs is not performed in accordance with the set update orders, depending on the result of the determination. Therefore, for example, update of a control program, whose update order is set to be later but whose required update time is suitable to a time period during which update can be performed, can be performed preferentially to update of a control program whose update order is set to be earlier. In other words, the update orders set on the plurality of control programs can be flexibly changed. Thus, update of the plurality of control programs can be efficiently performed.

A computer program included in the embodiments is a computer program for causing a computer to function as a control apparatus configured to control update of a control program of an on-vehicle control device configured to control a target device installed on a vehicle. The computer has a memory configured to store therein update programs for control programs. The computer program causes the computer to function as a control unit configured to update a plurality of control programs in accordance with update orders set on a plurality of update programs stored in the memory. The control unit executes a determination process of determining whether or not update of the plurality of control programs is to be performed in accordance with the update orders, based on comparison between required update times of the plurality of control programs and a predetermined threshold.

Since the control unit executes the determination process of determining whether or not update of the plurality of control programs is to be performed in accordance with the update orders set on the plurality of control programs, there may be cases where update of the plurality of control programs is not performed in accordance with the set update orders, depending on the result of the determination. Therefore, for example, update of a control program, whose update order is set to be later but whose required update time is suitable to a time period during which update can be performed, can be performed preferentially to update of a control program whose update order is set to be earlier. In other words, the update orders set on the plurality of control programs can be flexibly changed. Thus, update of the plurality of control programs can be efficiently performed.

DETAILED DESCRIPTION OF EMBODIMENT

Hereinafter, preferred embodiments will be described with reference to the drawings. In the following description, the same reference numerals refer to the same components and constituent elements. The names and functions thereof are also the same. Therefore, repeated description thereof is not necessary.

First Embodiment

[Overall Configuration of System]

FIG. 1 is a diagram showing an overall configuration of a program update system according to a first embodiment.

As shown in FIG. 1, the program update system of this embodiment includes vehicles 1, a management server 3, and a DL (download) server 4 which are able to communicate with each other via a wide-area communication network 2.

The management server 3 and the DL server 4 are operated by, for example, the automobile manufacturer of the vehicles 1, and are able to communicate with a large number of vehicles 1 owned by users registered as members in advance.

As shown in FIG. 1, each vehicle 1 includes an in-vehicle communication system 10. The in-vehicle communication system 10 includes a first network connected to a wireless communication apparatus 19 via a gateway 20. The in-vehicle communication system 10 may further include a second network directly connected to the wireless communication apparatus 19 without intervention of the gateway 20.

The first network includes: in-vehicle communication lines 13A, 13B, and 13C connected to the gateway 20; a manager device 14 connected to the in-vehicle communication line 13A; an in-vehicle communication line 15 connected to the manager device 14; and a plurality of on-vehicle control devices (hereinafter, referred to as "ECUs") 16 connected to the in-vehicle communication line 15 or the in-vehicle communication lines 13B and 13C.

Each of the in-vehicle communication lines 13A, 13B, and 13C consists of a bus-type communication network. This network is a communication network that performs relatively low-speed communication, such as CAN (Controller Area Network).

The in-vehicle communication line 15 allows mutual communication among the ECUs 16, and consists of a master/slave type communication network (e.g., LIN (Local Interconnect Network)) having the manager device 14 as a terminal node (master unit).

The second network includes one or more ECUs 16 directly connected to the wireless communication apparatus 19 via an in-vehicle communication line 13D.

The in-vehicle communication line 13D is a network that performs high-speed communication, and adopts a communication standard such as CANFD (CAN with Flexible Data Rate), Ethernet (registered trademark), or MOST (Media Oriented Systems Transport: MOST is a registered trademark), for example.

In the following description, a reference sign common to the in-vehicle communication lines is "13", and individual signs assigned to the in-vehicle communication lines are "13A, 13B, 13C, 13D".

The manager device 14 consists of an ECU, for example, a body-related ECU whose control target is equipment related to the body of the vehicle 1. The in-vehicle communication system 10 may include, as other manager devices, a manager device consisting of a power-related ECU whose control target is equipment related to driving of the vehicle 1, and a manager device consisting of a chassis-related ECU whose control target is equipment related to traveling of the vehicle 1. The control fields are not limited to the three fields described above, but four or more fields may be adopted. The control fields vary depending on design concepts of vehicle manufacturers, and sharing of the control fields is not limited to the above-described one.

The in-vehicle communication line 13A is a body-related bus, the in-vehicle communication line 13B is a power-related bus, and the in-vehicle communication line 13C is a chassis-related bus. To each bus, ECUs 16 of the type corresponding to the control field of the bus are connected.

Specifically, the ECUs 16 connected to the manager device 14 as a body-related ECU include, for example, an ECU for controlling interior lights, an ECU for controlling headlights, an ECU for controlling wipers, etc.

The ECUs 16 connected to the in-vehicle communication line 13B include, for example, an ECU for controlling an engine, an ECU for controlling a power supply system (such as ON/OFF control for a relay), etc.

The ECUs 16 connected to the in-vehicle communication line 13C include, for example, an ECU for controlling an ABS (Antilock Brake System), an ECU for normal brake control, etc.

Each of the ECUs 16 that belong to the second network is an ECU capable of updating a control program thereof by independently communicating with the DL server 4 via the wireless communication apparatus 19. The ECUs 16 that belong to the second network include, for example, multimedia-related ECUs. Specifically, the multimedia-related ECUs include an ECU for controlling a navigation device, an ECU for controlling a display, etc.

The in-vehicle communication system 10 further includes the wireless communication apparatus 19 and the gateway 20.

The wireless communication apparatus 19 is communicably connected to the wide-area communication network 2 such as a mobile phone network, and is connected to the gateway 20 via a communication line of a prescribed standard. One or more ECUs 16 may be directly connected to the wireless communication apparatus 19 via the in-vehicle communication line 13D.

As for the wireless communication apparatus 19 installed in the vehicle 1, a device possessed by the user, such as a mobile phone, a smart phone, a tablet-type terminal, or a notebook PC (Personal Computer), is conceivable.

The gateway 20 relays information received from external devices such as the management server 3 and the DL server 4 by the wireless communication apparatus 19, to the manager device 14 and the ECUs 16. The information received by the wireless communication apparatus 19 may be relayed directly to the ECUs 16 through the in-vehicle communication line 13D, without intervention of the gateway 20. The gateway 20 relays information received from the manager device 14 and the ECUs 16 to the wireless communication apparatus 19. The wireless communication apparatus 19 wirelessly transmits the relayed information to the external devices such as the management server 3.

FIG. 1 shows an exemplary case in which the gateway 20 communicates with the external devices via the wireless communication apparatus 19. However, if the gateway 20 has a function of wireless communication, the gateway 20 may be configured to wirelessly communicate with the external devices such as the management server 3.

In the program update system shown in FIG. 1, the management server 3 and the DL server 4 may be configured as a single server unit.

[Internal Configuration of Wireless Communication Unit]

Figure 2:
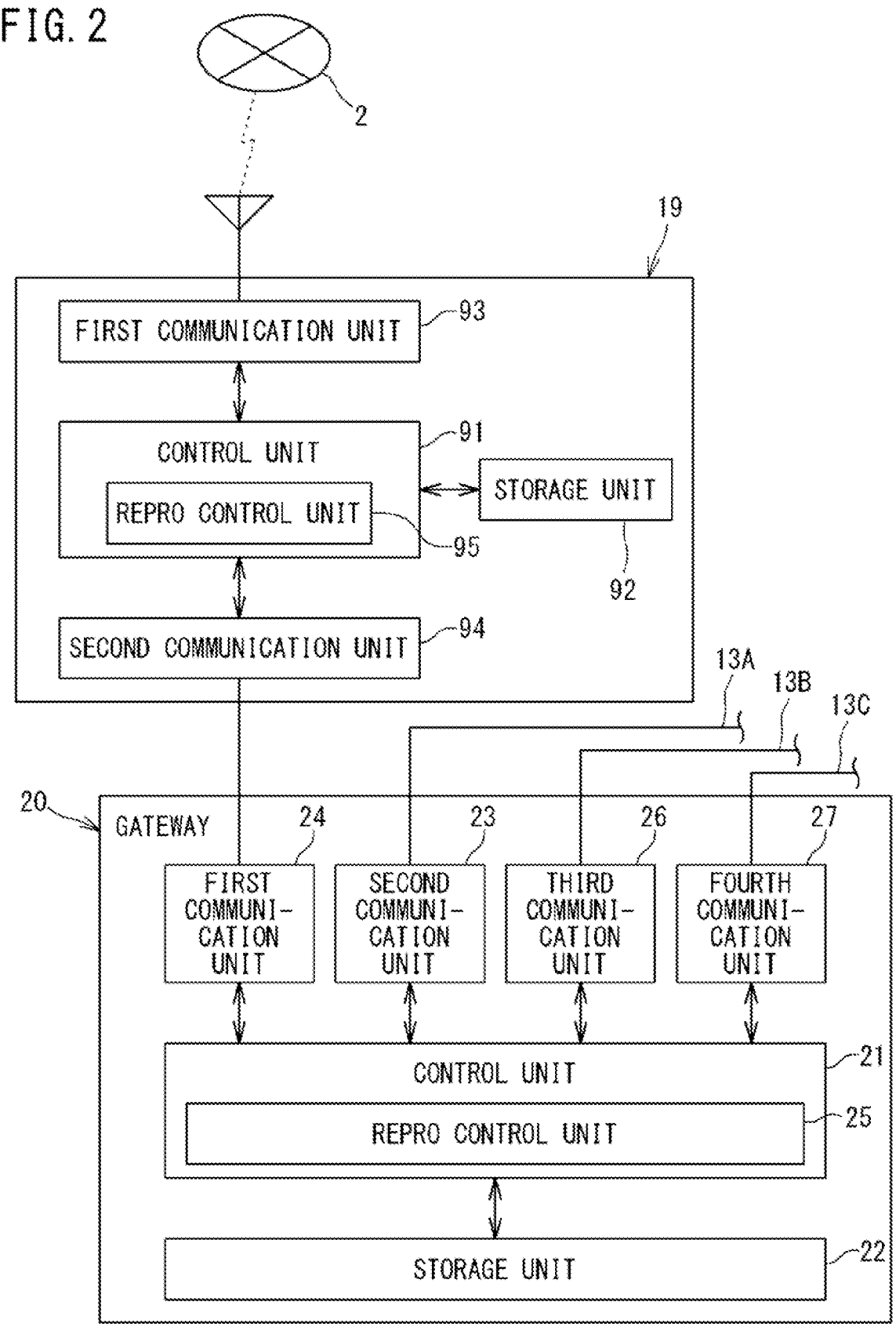
FIG. 2 is a block diagram showing internal configurations of a gateway and a wireless communication device.

FIG. 2 is a block diagram showing the internal configurations of the wireless communication apparatus 19 and the gateway 20.

As shown in FIG. 2, the wireless communication apparatus 19 includes a control unit 91, a storage unit 92, a first communication unit 93, and a second communication unit 94.

The control unit 91 of the wireless communication apparatus 19 includes a CPU (Central Processing Unit) and an RAM (Random Access Memory). The CPU of the control unit 91 reads out one or a plurality of programs stored in the storage unit 92 onto the RAM of the control unit 91, and executes the programs, thereby functioning as a repro control unit 95 for controlling update of control programs.

The CPU of the control unit 91 can execute a plurality of programs in parallel by switching between the plurality of programs in a time sharing manner, for example.

The CPU of the control unit 91 includes one or a plurality of large-scale integrated circuits (LSIs). In the CPU including a plurality of LSIs, the plurality of LSIs implement the function of the CPU in cooperation with each other.

The RAM of the control unit 91 consists of a memory element such as an SRAM (Static RAM) or a DRAM (Dynamic RAM), and temporarily stores therein programs to be executed by the CPU of the control unit 91, and data required in executing the programs.

A computer program to be executed by the CPU of the control unit 91 can be transferred in a state of being recorded in a recording medium such as a CD-ROM or a DVD-ROM, or may be transferred by download from a computer device such as a server computer.

In this regard, the same applies to computer programs to be executed by the control unit 21 of the gateway 20, the CPU of the control unit 31 (refer to FIG. 3) of the manager device 14, and the CPU of the control unit 41 (refer to FIG. 3) of the ECU 16.

The storage unit 92 consists of a nonvolatile memory element such as a flash memory or an EEPROM (Electrically Erasable Programmable Read Only Memory). The storage unit 92 has a storage area in which programs to be executed by the CPU of the control unit 91, data required in executing the programs, and the like are stored. The storage unit 92 also stores therein update programs for the manager device 14 and the ECUs 16, which are received from the DL server 4.

The first communication unit 93 consists of a wireless communication device including a communication circuit for executing transmission/reception of radio signals from an antenna. The first communication unit 93 is able to communicate with the external devices when being connected to the wide-area communication network 2 such as a mobile phone network.

The first communication unit 93 transmits information provided from the control unit 91 to the external devices such as the management server 3 via the wide-area communication network 2 formed by a base station (not shown), and provides information received from the external devices to the control unit 91.

The second communication unit 94 consists of a communication device that communicates with the gateway 20 in accordance with a predetermined communication standard such as CAN. The second communication unit 94 transmits information provided from the CPU of the control unit 91 to the gateway 20, and provides information from the gateway 20 to the CPU of the control unit 91.

The wireless communication apparatus 19 may be a communication apparatus that performs wired communication and serves as a relay device in the vehicle 1. In this case, the communication apparatus has a connector to which a communication cable conforming to a standard such as USB (Universal Serial Bus) or RS232C is connected, and performs wired communication with another communication device connected thereto via the communication cable.

If the other communication device and the external device such as the management server 3 can wirelessly communicate with each other via the wide-area communication network 2, the external device and the gateway 20 are able to communicate with each other through a communication path consisting of, in order, the external device, the other communication device, the communication apparatus, and the gateway 20.

[Internal Configuration of Gateway]

As shown in FIG. 2, the gateway 20 includes a control unit 21, a storage unit 22, a first communication unit 24, a second communication unit 23, a third communication unit 26, a fourth communication unit 27, and the like.

The control unit 21 of the gateway 20 includes a CPU and an RAM. The CPU of the control unit 21 reads out one or a plurality of programs stored in the storage unit 22 onto the RAM of the control unit 21, and executes the programs, thereby causing the gateway 20 to function as a relay device for various kinds of information. Further, the CPU of the control unit 21 reads out one or a plurality of programs stored in the storage unit 22 onto the RAM of the control unit 21, and executes the programs, thereby functioning as a repro control unit 25 for controlling update of control programs.

The CPU of the control unit 21 can execute a plurality of programs in parallel by switching between the plurality of programs in a time sharing manner, for example.

The CPU of the control unit 21 includes one or a plurality of large-scale integrated circuits (LSIs). In the CPU including a plurality of LSIs, the plurality of LSIs implement the function of the CPU in cooperation with each other.

The RAM of the control unit 21 consists of a memory element such as an SRAM or a DRAM, and temporarily stores therein programs to be executed by the CPU of the control unit 21, and data required in executing the programs.

The storage unit 22 consists of a nonvolatile memory element such as a flash memory or an EEPROM. The storage unit 22 has a storage area in which programs to be executed by the CPU of the control unit 21, data required in executing the programs, and the like are stored. The storage unit 22 also stores therein update programs for the manager device 14 and the ECUs 16, which are received from the DL server 4.

The wireless communication apparatus 19 is connected to the first communication unit 24. The first communication unit 24 consists of a communication device that communicates with the wireless communication apparatus 19 in accordance with a predetermined communication standard such as CAN.

The first communication unit 24 provides, to the CPU of the control unit 21, information provided from the wireless communication apparatus 19. In addition, the first communication unit 24 provides, to the wireless communication apparatus 19, information provided from the CPU of the control unit 21.

The in-vehicle communication lines 13A, 13B, and 13C are connected to the second communication unit 23, the third communication unit 26, and the fourth communication unit 27, respectively. The second communication unit 23, the third communication unit 26, and the fourth communication unit 27 each consist of a communication device that communicates with the manager device 14 or the ECUs 16 in accordance with a predetermined communication standard such as CAN. The second communication unit 23, the third communication unit 26, and the fourth communication unit 27 each transmit, to the predetermined manager device 14 or ECUs 16, information provided from the CPU of the control unit 21, and provides, to the CPU of the control unit 21, information transmitted from the manager device 14 or the ECUs 16.

[Internal Configuration of Manager Device]

Figure 3:
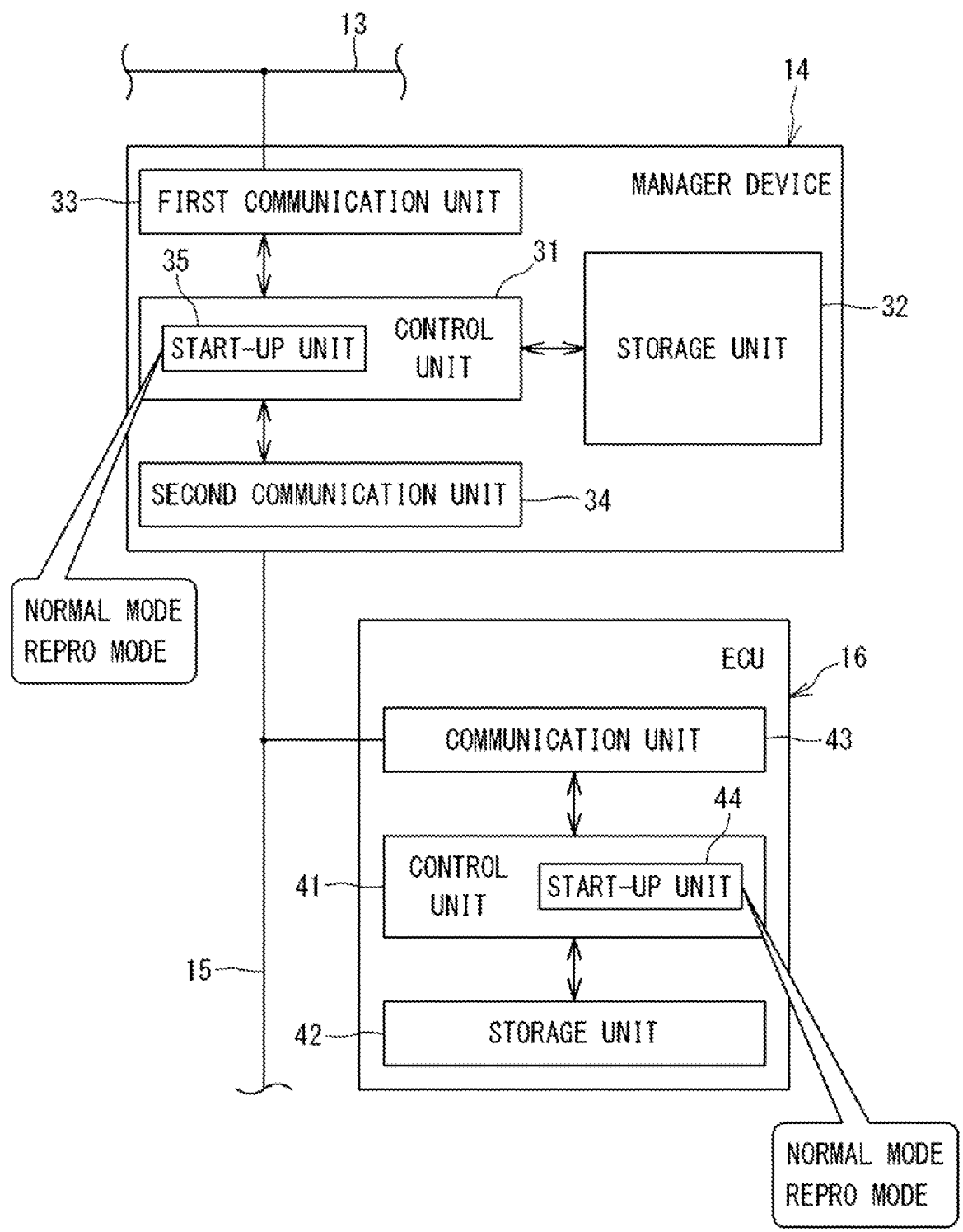
FIG. 3 is a block diagram showing internal configurations of a manager device and an ECU.

FIG. 3 is a block diagram showing the internal configurations of the manager device 14 and the ECU 16.

As shown in FIG. 3, the manager device 14 includes a control unit 31, a storage unit 32, a first communication unit 33, a second communication unit 34, and the like.

The control unit 31 of the manager device 14 includes a CPU and an RAM. The CPU of the control unit 31 reads out one or a plurality of programs stored in the storage unit 32 onto the RAM of the control unit 31, and executes the programs, thereby causing the manager device 14 to function as a master station for integrally controlling the ECUs 16 connected to the manager device 14.

The CPU of the control unit 31 can execute a plurality of programs in parallel by switching between the plurality of programs in a time sharing manner, for example.

The CPU of the control unit 31 includes one or a plurality of large-scale integrated circuits (LSIs). In the CPU including a plurality of LSIs, the plurality of LSIs implement the function of the CPU in cooperation with each other.

The RAM of the control unit 31 consists of a memory element such as an SRAM or a DRAM, and temporarily stores therein programs to be executed by the CPU of the control unit 31, and data required in executing the programs.

The storage unit 32 consists of a nonvolatile memory element such as a flash memory or an EEPROM, or a magnetic storage device such as a hard disk.

Information stored in the storage unit 32 includes, for example, a computer program (hereinafter referred to as "control program") that causes the CPU of the control unit 31 to execute information processing for controlling a control target (ECU 16 or the like) of a vehicle 1 that the manager device 14 is in charge of.

The in-vehicle communication line 13A is connected to the first communication unit 33. The first communication unit 33 consists of a communication device that communicates with the gateway 20 in accordance with a predetermined communication standard such as CAN.

The first communication unit 33 transmits, to the gateway 20, information provided from the CPU of the control unit 31, and provides, to the CPU of the control unit 31, information transmitted from the gateway 20.

The in-vehicle communication line 15 is connected to the second communication unit 34. The second communication unit 34 consists of a communication device that communicates with the ECUs 16 connected to the in-vehicle communication line 15, in accordance with a predetermined communication standard such as LIN.

The second communication unit 34 transmits, to a predetermined ECU 16, information provided from the CPU of the control unit 31, and provides, to the CPU of the control unit 31, information transmitted from the ECU 16.

The CPU of the control unit 31 includes a start-up unit 35 that switches the control mode of the CPU, between a "normal mode" and a "reprogramming mode" (hereinafter also referred to as "repro mode").

The normal mode of the manager device 14 is a control mode in which the manager device 14 executes its original control, that is, a control mode in which the manager device 14 serves as a master station to integrally control the ECUs 16.

The reprogramming mode is a control mode in which the control program of the manager device 14 is updated. That is, the reprogramming mode is a control mode in which the CPU of the control unit 31 performs erasing/rewriting of the control program from/on an ROM area in the storage unit 32.

Only when the CPU of the control unit 31 is in this control mode, the CPU can update the control program stored in the ROM area in the storage unit 32 to the new version.

When the CPU of the control unit 31, in the repro mode, writes the new version of the control program into storage unit 32, the start-up unit 35 temporarily restarts the manager device 14, and executes a verifying process on the storage area where the new version of the control program has been written.

After completion of the verifying process, the start-up unit 35 operates the CPU of the control unit 31 according to the updated control program.

[Internal Configuration of ECU]

As shown in FIG. 3, the ECU 16 includes a control unit 41, a storage unit 42, a communication unit 43, and the like.

The control unit 41 of the ECU 16 includes a CPU and an RAM. The CPU of the control unit 41 reads out one or a plurality of programs stored in the storage unit 42 onto the RAM of the control unit 41, and executes the programs, thereby causing the ECU 16 to function as an on-vehicle control device for controlling the operation of a target device that the ECU 16 is in charge of.

The CPU of the control unit 41 can execute a plurality of programs in parallel by switching between the plurality of programs in a time sharing manner, for example.

The CPU of the control unit 41 includes one or a plurality of large-scale integrated circuits (LSIs). In the CPU including a plurality of LSIs, the plurality of LSIs implement the function of the CPU in cooperation with each other.

The RAM of the control unit 41 consists of a memory element such as an SRAM or a DRAM, and temporarily stores therein programs to be executed by the CPU of the control unit 41, and data required in executing the programs.

The storage unit 42 consists of a nonvolatile memory element such as a flash memory or an EEPROM, or a magnetic storage device such as a hard disk.

Information stored in the storage unit 42 includes a control program for causing the CPU of the control unit 41 to execute information processing for controlling an in-vehicle control target (target device such as interior lights, headlights, or wipers, in the case of the ECU 16) that the ECU 16 is in charge of.

The subordinate in-vehicle communication line 15 is connected to the communication unit 43. The communication unit 43 consists of a communication device that communicates with the manager device 14 as a master station of the ECU 16 or with other ECUs 16 in accordance with a predetermined communication standard such as LIN.

The communication unit 43 transmits, to other ECUs 16 or the manager device 14, information provided from the CPU of the control unit 41, and provides, to the control unit 41, information transmitted from other ECUs 16 or the manager device 14.

The CPU of the control unit 41 includes a start-up unit 44 that switches the control mode of the CPU, between the "normal mode" and the "reprogramming mode".

The normal mode of the ECU 16 is a control mode in which the ECU 16 executes its original control, that is, a control mode in which the ECU 16 control an in-vehicle control target that the ECU 16 is in charge of.

The reprogramming mode is a control mode in which the control program of the ECU 16 is updated. That is, the reprogramming mode is a control mode in which the CPU of the control unit 41 performs erasing/rewriting of the control program from/on an ROM area in the storage unit 42.

Only when the CPU of the control unit 41 is in this control mode, the CPU can update the control program stored in the ROM area in the storage unit 42 to the new version.

When the CPU of the control unit 41, in the repro mode, writes the new version of the control program into the storage unit 42, the start-up unit 44 temporarily restarts the ECU 16, and executes a verifying process on the storage area where the new version of the control program has been written.

After completion of the verifying process, the start-up unit 44 operates the CPU of the control unit 41 with the updated control program.

[Sequence of in-Vehicle Communication at Program Update]

Figure 4:
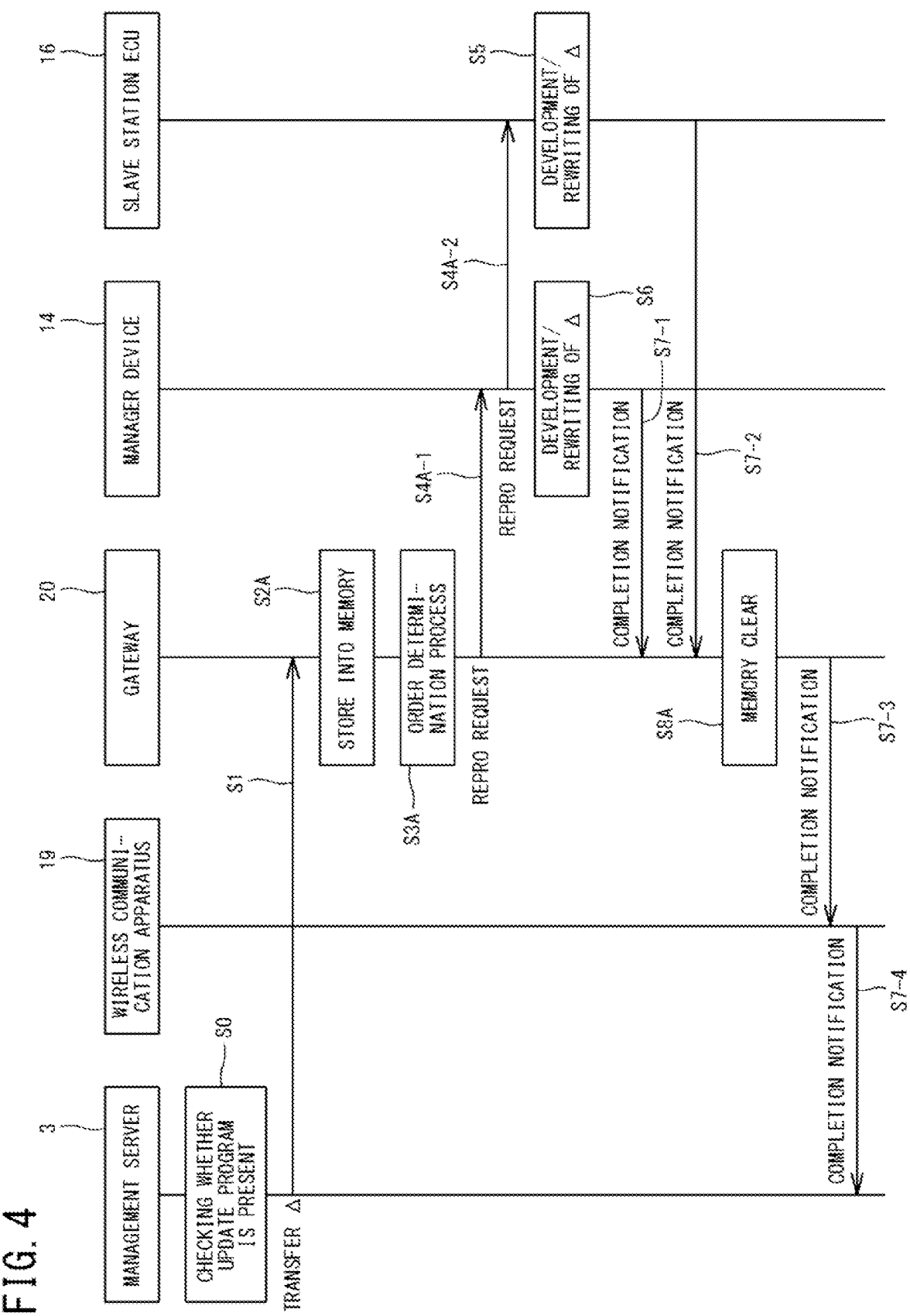
FIG. 4 is a sequence diagram showing an example of a communication procedure in an in-vehicle communication system, in the program update system according to a first embodiment.

FIG. 4 is a sequence diagram showing an example of a communication procedure in the in-vehicle communication system 10 in the program update system according to the first embodiment. In the first embodiment, a case where an ECU 16 including a manager device 14 updates a control program will be described.

In FIG. 4, a "slave station ECU" is an ECU 16 connected to the manager device 14 via the in-vehicle communication line 13A, or an ECU 16 connected to the gateway 20 via the in-vehicle communication line 13B or 13C. In FIG. 4, "Δ" indicates an update program (difference program) for a control program of the ECU 16 including the manager device 14.

Although an update program for a control program may be a new version of the control program itself, it is assumed in this embodiment that an update program is a difference program from the old version.

In this case, if an update program Δ containing difference information of files between the old version and the new version is stored in the same storage area, the control unit 41 of the ECU 16 including the manager device 14 can update the control program to the new version by applying the update program Δ to the old version.

With reference to FIG. 4, first, the management server 3 confirms whether or not there is an update program Δ distributed from the DL server 4 via the wide-area communication network 2, that is, whether or not there is an update program Δ to be used for update (step S0). This confirmation may be performed in the wireless communication apparatus 19. When there is an update program Δ to be used for update, the following sequence is started. When there is no update program Δ to be used for update, the sequence shown in FIG. 4 is not started.

When there is an update program Δ to be used for update, the management server 3 transfers the update program Δ to the gateway 20 (step S1). Transfer of the update program Δ by the management server 3 may be performed in response to a download start request from the gateway 20. The gateway 20 checks that the manufacturer of the downloaded update program Δ is valid and that the update program Δ has not been altered, and then stores the update program Δ in the storage unit 22 (step S2A).

At a predetermined timing after download of the update program Δ, the gateway 20 updates a control program corresponding to the update program Δ in accordance with an update order that is set on the update program Δ. At this time, if a plurality of update programs Δ are stored in the storage unit 22, the gateway 20 determines whether or not the corresponding control programs are to be updated in accordance with the update orders set on the respective update programs Δ. When the result of the determination is negative, the gateway 20 executes a process of resetting the update orders (step S3A). Then, the gateway 20 transfers the update programs Δ in accordance with the set update orders or the reset update orders, thereby requesting update (step S4A-1, S4A-2).

The manager device 14 which has received an update request from the gateway 20 or the ECU 16 which has received an update request from the gateway 20 via the manager device 14, develops the update program Δ and applies the update program Δ to the old version, thereby rewriting the control program to the new version (step S5, S6).

When update of the control program is completed, the manager device 14 notifies the gateway 20 of the completion of update (step S7-1). The ECU 16 notifies the gateway 20 of the completion of update via the manager device 14 (step S7-2). The gateway 20 notifies the management server 3 of the completion of update via the wireless communication apparatus 19 (step S7-3, S7-4). Thus, the management server 3 can confirm the completion of update in the vehicle 1, and thereafter, prevents the update program Δ of the control program from being distributed from the DL server 4. If the management server 3 is not notified of completion of update of the control program, the management server 3 causes the DL server 4 to distribute an update program Δ for the control program again. Upon receiving the notification, the gateway 20 clears the memory (step S8A).

In the sequence shown in FIG. 4, the gateway 20 performs control as follows. That is, the gateway 20 updates control programs in accordance with the update orders set on a plurality of update programs Δ, or executes a determination process of determining whether or not a plurality of control programs are to be updated in accordance with the update orders, and updates the control programs in accordance with the update orders that are reset based on the result of the determination. Therefore, in the first embodiment, the gateway 20 corresponds to a control apparatus that controls update of control programs of an on-vehicle control device.

[Details of Order Determination Process]

When update of a control program is performed in the manager device 14, after the manager device 14 shifts into the repro mode, a preparation process for rewriting of the control program on the ROM area in the storage unit 32, a rewriting process on the ROM area, and restart of the manager device 14 are performed. When the manager device 14 is restarted, control of the manager device 14 for the ECUs 16 connected to the manager device 14 is suspended, and these ECUs 16 are returned to the controlled states with the restart of the manager device 14. The manager device 14 and the ECUs 16, which belong to the first network, are communicable with each other, and are linked with each other in a complicated manner. Therefore, the aforementioned restart may be restart of the whole in-vehicle communication system 10.

Also when update of a control program is performed in an ECU 16 connected to the manager device 14 or when update of a control program is performed in an ECU 16 connected to the gateway 20 via the in-vehicle communication line 13B or 13C, after the ECU 16 shifts into the repro mode, a preparation process for rewriting of the control program on the ROM area in the storage unit 42, a rewriting process on the ROM area, and restart of the ECU 16 are performed. When the ECU 16 is restarted, operations of other ECUs 16 in conjunction with the ECU 16, such as other ECUs 16 connected to the same manager device 14 as the ECU 16 or other ECUs 16 belonging to the same control field as the ECU 16, are suspended, and these ECUs 16 are also returned to their normal operation states with the restart of the ECU 16. Also when update of a control program is performed in an ECU 16 that belong to the first network, the aforementioned restart may be restart of the whole in-vehicle communication system 10.

Accordingly, when update of a control program is performed in the first network, the in-vehicle communication system 10 cannot perform its normal operation during a time period corresponding to the total of: a time period for the preparation process for rewriting; a time period for rewriting; and a time period from when restart of the corresponding ECU 16 is completed to when the ECUs 16 in conjunction with the ECU 16 are returned to their normal operation states. This total time is also referred to as a required repro (update) time Tr in the following description. The required repro time Tr is a time period from switching to the repro mode to return to the normal mode, in other words, a time period from start of update of a control program to return to the state controllable with the updated control program. That is, in the first embodiment, the required repro time Tr can be considered to be not only a time period during which only the function of the ECU 16 whose control program is to be updated cannot be used, but also a time period during which update of the control program affects devices other than the device to be controlled by the ECU 16.

The required repro time Tr varies from control program to control program, depending on the memory capacity required for update of each control program, the number of devices to be restarted, and the like. For example, when only an ECU 16 whose control program is updated is restarted, the time until completion of the restart is shorter and the required repro time Tr is also shorter than in the case where the whole in-vehicle communication system 10 is restarted. In addition, the higher the processing capability of the CPU of the control unit 41 of the target ECU 16 is, the shorter the required repro time Tr becomes.

When a plurality of update programs Δ are stored in the storage unit 22, if update with an update program Δ having a longer required repro time Tr is executed first, start of update with the subsequent update program Δ is delayed. Therefore, when the number of control programs, whose update should be completed within a predetermined time period, is emphasized, in other words, when update of more control programs is desired to be completed within a shorter time period, update with an update program Δ having a longer required repro time Tr should not be performed first.

Therefore, the gateway 20, which functions as a control apparatus in the first embodiment, determines whether or not control programs are to be updated in accordance with update orders set on the plurality of update programs Δ stored in the storage unit 22, based on the required repro times Tr of the respective update programs Δ. When the result of the determination is negative, the gateway 20 resets the update orders set on the plurality of update programs Δ.

Figure 5:
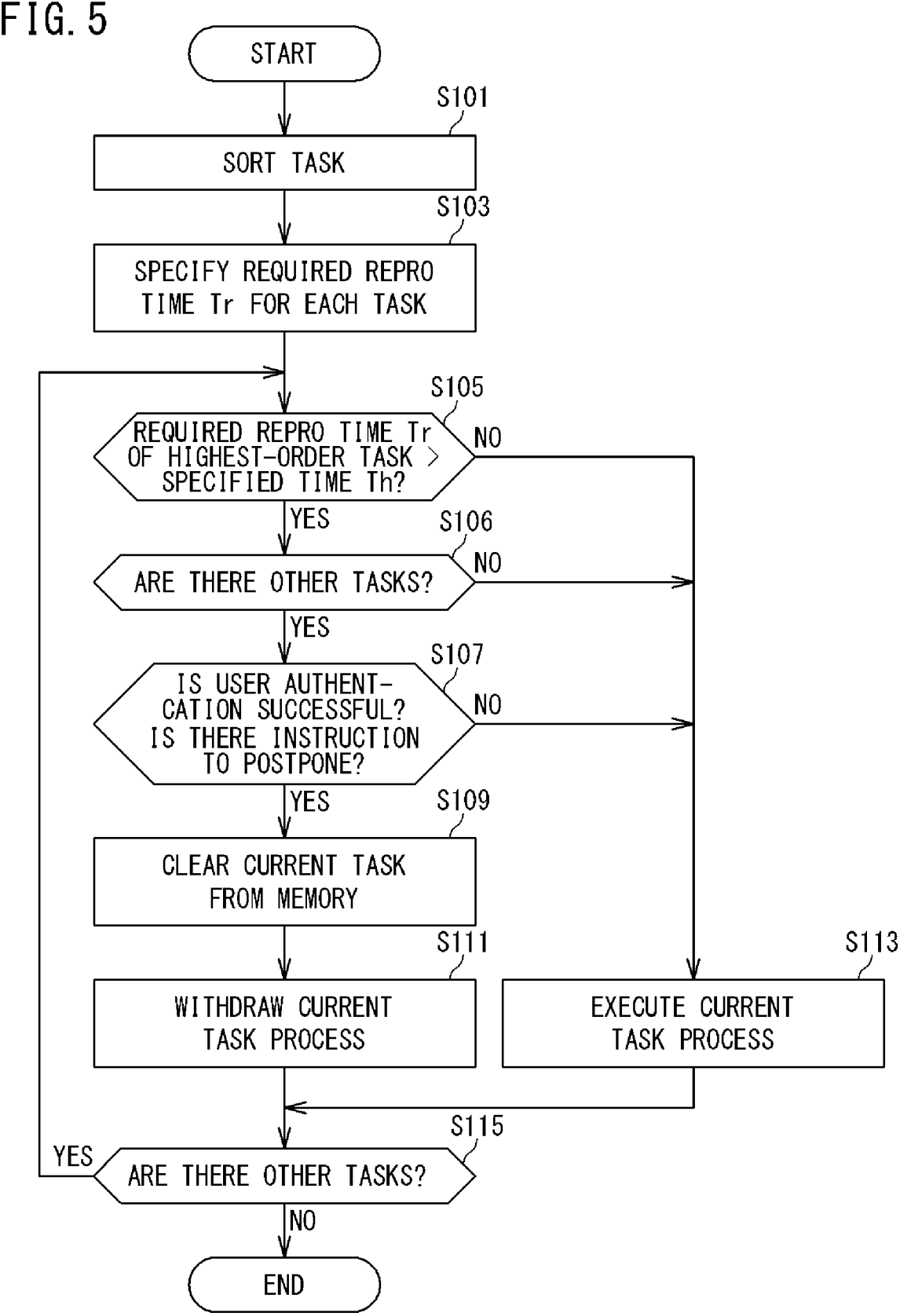
FIG. 5 is a flowchart showing an example of a specific content of an order determination process in step S3A in FIG. 4.

FIG. 5 is a flowchart showing an example of a specific content of the order determination process in step S3A shown in FIG. 4. The CPU of the control unit 21 of the gateway 20 functions as the repro control unit 25 by reading out one or a plurality of programs stored in the storage unit 22 onto the RAM, and executing the read program, and the processing shown in the flowchart of FIG. 5 is implemented by the repro control unit 25.

With reference to FIG. 5, the CPU of the control unit 21 sorts the update programs Δ stored in the storage unit 22, in accordance with prescribed conditions (step S101). The prescribed conditions include, for example, an order in which the update programs Δ are downloaded from the DL server 4, an order designated by the DL server 4, an order of sizes of the update programs Δ, and the like.

Next, the CPU specifies, for each of the update programs Δ stored in the storage unit 22, a required repro time Tr due to update of the update program Δ (step S103). Alternatively, required repro times Tr may be provided from the DL server 4. Still alternatively, the CPU may calculate required repro times Tr, based on information regarding update programs Δ, such as the sizes of the update programs Δ, provided from the DL server 4.

In order from an update program Δ having the earliest update order (having the highest ordinal rank), the CPU determines whether or not the corresponding control program is to be updated in accordance with the set update order (steps S105 to S113). Specifically, as for the update program Δ of the highest ordinal rank, the CPU compares the required repro time Tr of the update program Δ with a prescribed time Th stored in advance (step S105). The prescribed time Th is about several tens seconds to several minutes.

When the required repro time Tr of the update program Δ of the highest ordinal rank is longer than the prescribed time Th (YES in step S105) and other update programs Δ whose set update orders are later than the update order of the update program Δ are stored in the storage unit 22 (YES in step S106), the CPU determines that the corresponding control program should not be updated according to the set update order. When arriving at the negative determination result, the CPU resets the update order of the update program Δ to an update order different from the earliest order (the highest ordinal rank) that has been set (step S111). Specifically, the CPU resets the update order of the update program Δ to be later than another update program Δ whose update order has been later than that of the update program Δ. Here, for example, it is assumed that the update order of the update program Δ is reset to the latest update order (lowest ordinal rank). In another example, the update order of the update program Δ may be reset to the second earliest update order (second highest ordinal rank) by interchanging the update orders between the update program Δ and an update program Δ of the second earliest update order (second highest ordinal rank).

When the required repro time Tr is within the prescribed time Th, the CPU determines to update the control program using the update program Δ in accordance with the set update order (step S113). Upon arriving at this positive determination result, the CPU executes the sequence on and after step S4A-1 shown in FIG. 4. Thus, update of the control program is executed.

Upon arriving at the negative determination result in the aforementioned determination process, the CPU preferably deletes the update program Δ stored in the storage unit 22 (step S109). Thus, when update of a control program is not performed in a device to be updated, an unnecessary update program Δ is not stored in the storage unit 22, thereby preventing the memory from being cluttered.

In the case where the required repro time Tr is longer than the prescribed time Th, the CPU may perform user authentication, and when the user (driver) is an authorized user and the CPU is instructed by the user to postpone update of the update program Δ regardless of the update order (YES in step S107), the CPU may reset the update order of the update program Δ to an update order different from the earliest order (highest ordinal rank) that has been set (step S111). Thus, an authorized user, such as the owner of the vehicle 1, can manage update of control programs.

When the aforementioned determination for the update program Δ of the earliest update order is ended, the CPU checks whether or not other update programs Δ whose set update orders are later than the update order of the update program Δ are stored in the storage unit 22. When the other update programs Δ are stored (YES in step S115), the CPU repeats the processing from step S105 to perform the aforementioned determination on all the update programs Δ stored in the storage unit 22 (NO in step S115).

Effects of First Embodiment

According to the program update system of the first embodiment, when a plurality of update programs Δ are stored in the storage unit 22 and an update program Δ whose required repro time Tr is longer than the prescribed time Th is included in the update programs Δ, it is determined that update of control programs should not be performed according to update orders set on these update programs Δ, and the update orders are reset. Specifically, as for the update program Δ whose required repro time Tr is longer than the prescribed time Th, the update order thereof is reset so that update of the corresponding control program is postponed to be later than update of other control programs.

The update program Δ whose update is postponed is deleted from the storage unit 22. When a control program is not updated, completion of update thereof is not notified to the management server 3. Therefore, an update program Δ for the control program is downloaded from the DL server 4 again. Consequently, update of the control program is postponed to be later than next download of the update program Δ from the DL server 4.

Thus, update of a control program using an update program Δ whose required repro time Tr is within the prescribed time Th is preferentially performed. Therefore, update of more control programs can be completed within a shorter time period. That is, the update orders can be flexibly changed according to the time period during which update can be performed, resulting in efficient update of control programs.

Second Embodiment

In the above example, when the required repro time Tr is longer than the prescribed time Th, the update order is reset so that update is postponed. However, when the required repro time Tr is shorter than the prescribed time Th, the update order may be reset so that update is postponed. For example, when the time period during which update can be performed is long, update may be performed in descending order of required repro time Tr.

The condition for update of a control program may be changed between the condition that the required repro time Tr is shorter than the prescribed time Th and the condition that the required repro time Tr is longer than the prescribed time Th. Only a specific user may be allowed to change the condition. Further, the prescribed time Th may be variable. Only a specific user may be allowed to change the prescribed time Th.

When update of a control program whose required repro time Tr is not shorter than the prescribed time Th is preferentially performed, update with long required repro time Tr can be completed first when update of control programs can be performed over a long time period. That is, the update orders previously set on a plurality of control programs can be flexibly changed according to the time period during which update can be performed, resulting in efficient update of control programs.

Third Embodiment

Each of the ECUs 16, which belong to the second network and are directly connected to the wireless communication apparatus 19 through the in-vehicle communication line 13D, is an ECU such as a multimedia-related ECU capable of updating a control program by independently communicating with the DL server 4 via the wireless communication apparatus 19. Therefore, when update of the control program of the ECU 16 is performed, after the ECU 16 shifts into the repro mode, a process of rewriting the control program on the ROM area in the storage unit 42, and restart of an application installed on a device to be controlled by the ECU 16, are performed.

Therefore, when update of a control program is performed in the second network, the application in the corresponding device cannot be used during a time period corresponding to the total of: a time period for the rewriting process; and a time period until restart of the application is completed. That is, when update of a control program is performed in the second network, the required repro time Tr corresponds to the total of: the time period for the rewriting process; and the time period until restart of the application is completed. That is, in this third embodiment, the required repro time Tr can be considered to be a time period during which only the function of the ECU 16 whose control program is to be updated cannot be used.

Figure 6:
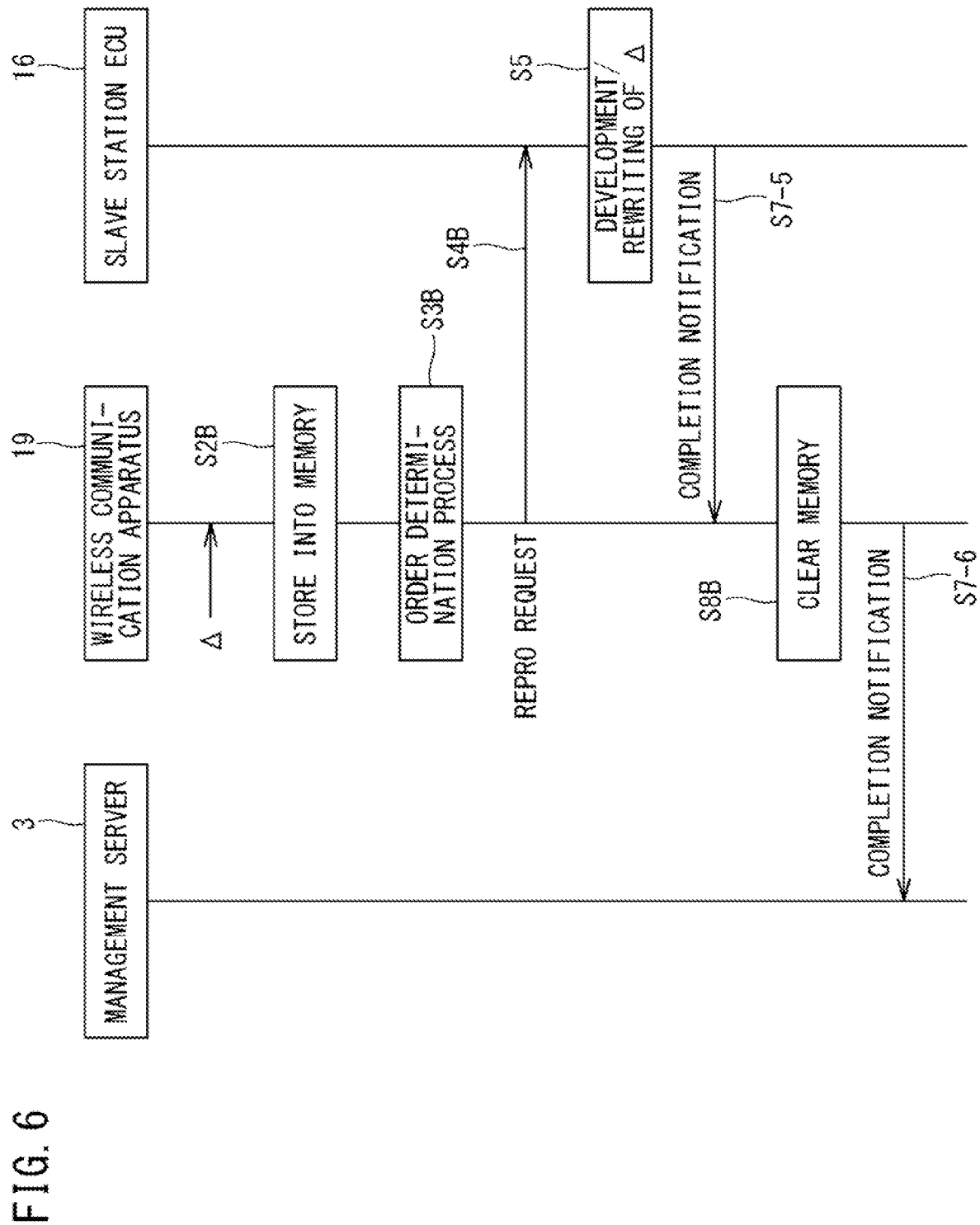
FIG. 6 is a sequence diagram showing an example of a communication means in an in-vehicle communication system, in a program update system according to a third embodiment.

FIG. 6 is a sequence diagram showing an example of a communication means in the in-vehicle communication system 10 in the program update system according to the third embodiment. In this third embodiment, a description will be given of a case where a control program of an ECU 16, which belongs to the second network and is directly connected to the communication apparatus 19 through the in-vehicle communication line 13D, is updated.

With reference to FIG. 6, in this case, the wireless communication apparatus 19 stores an update program Δ downloaded from the DL server 4 into the storage unit 92, after checking the safety of the update program Δ (step S2B). At a predetermined timing after download of the update program Δ, the wireless communication apparatus 19 updates a control program corresponding to the update program Δ in accordance with an update order set on the update program Δ. At this time, if a plurality of update programs Δ are stored in the storage unit 92, the wireless communication apparatus 19 determines whether or not the corresponding control programs are to be updated in accordance with the update orders set on the respective update programs Δ. When the result of the determination is negative, the wireless communication apparatus 19 executes a process of resetting the update orders (step S3B). Then, the wireless communication apparatus 19 transfers the update programs Δ to the target ECUs 16 in accordance with the set update orders or the reset update orders, and requests the ECUs 16 to perform update (step S4B). Upon receiving the update request from the wireless communication apparatus 19, each ECU 16 develops the update program Δ and applies the update program Δ to the old version, thereby rewriting the control program to the new version (step S5).

When update of the control program is completed, the ECU 16 notifies the gateway 20 of completion of update (step S7-5). The gateway 20 notifies the management server 3 of completion of update via the wireless communication apparatus 19 (step S7-6). Thus, the management server 3 can confirm completion of update in the vehicle 1, and thereafter, prevents the update program Δ of the control program from being distributed from the DL server 4. When the management server 3 is not notified of completion of update of the control program, the management server 3 causes the DL server 4 to distribute a new program Δ of the control program. Upon receiving the notification, the wireless communication apparatus 19 clears the memory (step S8B).

In the sequence of FIG. 6, the wireless communication apparatus 19 updates control programs in accordance with the update orders set on a plurality of update programs Δ, or executes a determination process of determining whether or not the control programs are to be updated in accordance with the update orders, and updates the control programs in accordance with the update orders that are reset based on the result of the determination. Therefore, in this third embodiment, the wireless communication apparatus 19 corresponds to a control apparatus that controls update of control programs of an on-vehicle control device.

In the program update system according to the third embodiment, the wireless communication apparatus 19 that functions as a control apparatus executes the order determination process in step S3B. The order determination process in step S3B is the same as the process shown in the flowchart of FIG. 5. That is, in the program update system according to the third embodiment, the CPU of the control unit 91 of the wireless communication apparatus 19 reads out one or a plurality of programs stored in the storage unit 92 onto the RAM, and executes the program, thereby functioning as the repro control unit 95. The order determination process shown in FIG. 5 is implemented by the repro control unit 95.

Effects of Third Embodiment

Also in the program update system according to the third embodiment, as for an update program Δ whose required repro time Tr is longer than the prescribed time Th, update with this update program Δ is postponed. That is, update using an update program Δ whose required repro time Tr is within the prescribed time Th is preferentially performed. Therefore, update of more update programs Δ can be completed within a shorter time period.

Fourth Embodiment

Each of the ECUs 16 which belong to the second network is, for example, a multimedia-related ECU, and update of a control program thereof is, for example, update of an application for controlling the multimedia device. Therefore, high-speed communication is established between a communication device and the ECU, and the communication device may not ensure a memory for absorbing a difference in communication speed. In addition, since the capacity of the memory of the multimedia-related ECU is large, the size of each update program Δ may not have significant influence on the memory capacity even when the update program Δ is stored in the storage unit 92. Therefore, when update of a control program is postponed because of the required repro time Tr being longer than the prescribed time Th, resetting of the update order may be performed while the corresponding update program Δ remains in the storage unit 92 without being deleted therefrom.

Figure 7:
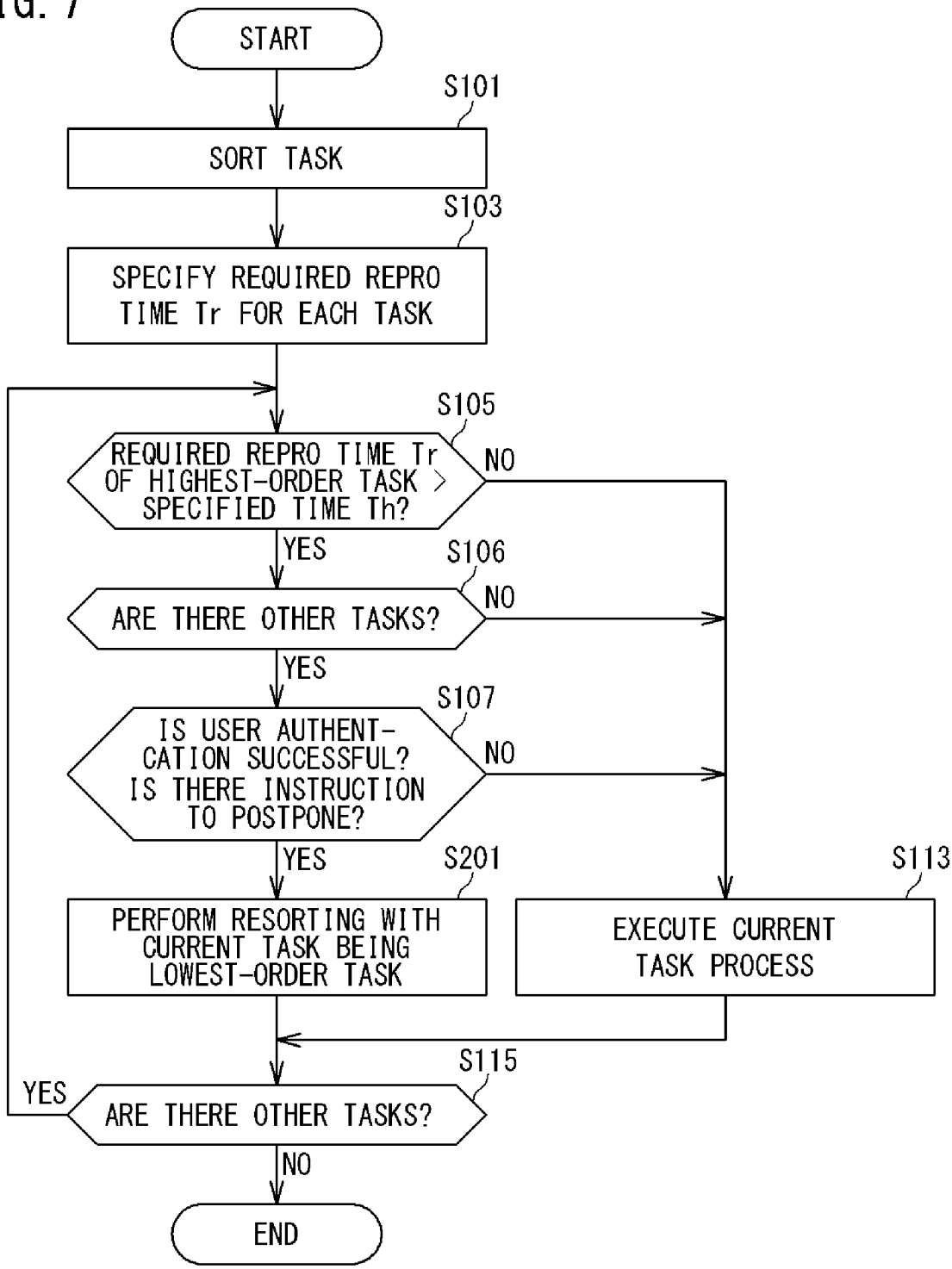
FIG. 7 is a flowchart showing an example of a specific content of an order determination process in step S3B in FIG. 6.

FIG. 7 is a flowchart showing an example of a specific content of the order determination process in step S3B in FIG. 6. When the CPU of the control unit 91 of the wireless communication apparatus 19 reads out one or a plurality of programs stored in the storage unit 92 onto the RAM and executes the program, the CPU functions as the repro control unit 95, and the processing shown by the flowchart of FIG. 7 is implemented by the repro control unit 95. In FIG. 7, the same step numbers as in the flowchart shown in FIG. 5 denote the same processes. Therefore, the same processes as in the flowchart shown in FIG. 5 are not repeatedly described.

With reference to FIG. 7, when the CPU of the control unit 91 determines that update of a control program should not be performed according to the set update order, based on the result of comparison between the required repro time Tr and the prescribed time Th (YES in step S105), the CPU resets the update order of the corresponding update program Δ to be later than the set update order (step S201). For example, the CPU resets the update order of the update program Δ to the latest update order.

In the program update system according to the fourth embodiment, the update program Δ, whose update order is postponed in accordance with the result of comparison between the required repro time Tr and the prescribed time Th, is stored in the storage unit 92 of the ECU 16. Therefore, update of a control program using the update program Δ stored in the storage unit 92 can be performed at a timing when update is possible, without waiting for the next download from the DL server 4.

Fifth Embodiment

A plurality of update programs Δ downloaded from the DL server 4 to the wireless communication apparatus 19 may include both update programs Δ for devices (manager device 14 or ECUs 16) belonging to the first network, and update programs Δ for devices (ECUs 16) belonging to the second network. In this case, the CPU of the control unit 91 of the wireless communication apparatus 19 may temporarily store all the update programs Δ into the storage unit 92, and may perform the order determination process on the plurality of update programs Δ. That is, while in FIG. 4 the gateway 20 functions as a control apparatus to perform the order determination process (step S3A) on the update programs Δ for the devices belonging to the first network, the wireless communication apparatus 19 may function as a control apparatus to perform the order determination process (step S3B) on all the update programs Δ.

In this case, even when the update programs Δ for the devices (manager device 14 or ECU 16) belonging to the first network and the update programs Δ for the devices (ECUs 16) belonging to the second network are downloaded together from the DL server 4 to the wireless communication apparatus 19, update with an update program Δ whose required repro time Tr is longer than the prescribed time Th is postponed. That is, update with an update program Δ whose required repro time Tr is within the prescribed time Th is preferentially performed. Therefore, update of more update programs Δ can be completed within a shorter time period.

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
3 management server
4 server
10 in-vehicle communication system
13A, 13B, 13C, 13D, 15 in-vehicle communication line
14 manager device
16 ECU
19 wireless communication apparatus
20 gateway
21, 31, 41, 91 control unit
22, 32, 42, 92 storage unit
23, 34, 94 second communication unit
24, 33, 93 first communication unit
26 third communication unit
27 fourth communication unit
25, 95 repro control unit
35, 44 start-up unit
43 communication unit

The invention claimed is:

1. A control apparatus configured to control update of a control program of an on-vehicle control device configured to control a target device installed on a vehicle, the control apparatus comprising:
a non-transitory computer readable memory storing therein update programs for control programs; and
a hardware processor coupled to the memory and configured to read instructions from the memory to cause the control apparatus to perform operations to update a plurality of control programs in accordance with update orders set on a plurality of update programs stored in the memory, wherein
the operations comprise executing a determination process of determining whether or not update of the plurality of control programs is to be performed in accordance with the update orders, based on comparison between required update times of the plurality of control programs and a predetermined threshold,
when the on-vehicle control device is a first device, the required update time of the first device includes a first time period and a second time period,
the first time period is a time period during which the first device can not be used due to updating of the control program of the first device,
the second time period is a time period until which a second device returns to a normal operating state after the first device has been updated, the second device cooperating with the first device, the second time period including no update time of a control program of the second device, and
the first device and the second device belong to an on-vehicle network.

2. The control apparatus according to claim 1, wherein as for a control program for which a result of the determination process is negative, the operations include storing an update program corresponding to this control program in the memory, and resetting the update order of the update program to be later than the previously set update order thereof.

3. The control apparatus according to claim 1, wherein as for a control program for which a result of the determination process is negative, the operations include deleting an update program corresponding to this control program from the memory.

4. The control apparatus according to claim 1, wherein when the required update time is longer than the predetermined threshold, a result of the determination process is negative.

5. The control apparatus according to claim 4, wherein when the required update time is longer than the predetermined threshold and user authentication is successful, the result of the determination process is negative.

6. The control apparatus according to claim 1, wherein when the required update time is shorter than the predetermined threshold, a result of the determination process is negative.

7. The control apparatus according to claim 6, wherein when the required update time is shorter than the predetermined threshold and user authentication is successful, the result of the determination process is negative.

8. The control apparatus according to claim 1, wherein the determination process is selectable between determining a result of the determination process to be negative when the required update time is longer than the predetermined threshold, and determining a result of the determination process to be negative when the required update time is shorter than the predetermined threshold.

9. The control apparatus according to claim 1, wherein the predetermined threshold is variable.

10. A program update method for updating a control program of an on-vehicle control apparatus configured to control a target device installed on a vehicle, the method comprising:
a first step of storing an update program for a control program in a memory; and
a second step of updating a plurality of control programs in accordance with update orders set on a plurality of update programs stored in the memory, wherein
the second step includes a third step of determining whether or not update of the plurality of control programs is to be performed in accordance with the update orders, based on comparison between required update times of the plurality of control programs and a predetermined threshold,
when the on-vehicle control device is a first device, the required update time of the first device includes a first time period and a second time period,
the first time period is a time period during which the first device can not be used due to updating of the control program of the first device,
the second time period is a time period until which a second device returns to a normal operating state after the first device has been updated, the second device cooperating with the first device, the second time period including no update time of a control program of the second device, and
the first device and the second device belong to an on-vehicle network.

11. A non-transitory computer readable storage medium storing a computer program for causing a computer to function as a control apparatus configured to control update of a control program of an on-vehicle control device configured to control a target device installed on a vehicle,
the computer having a memory configured to store therein update programs for control programs,
the computer program causing the computer to function as a control unit configured to update a plurality of control programs in accordance with update orders set on a plurality of update programs stored in the memory, wherein
the control unit executes a determination process of determining whether or not update of the plurality of control programs is to be performed in accordance with the update orders, based on comparison between required update times of the plurality of control programs and a predetermined threshold,
when the on-vehicle control device is a first device, the required update time of the first device includes a first time period and a second time period,
the first time period is a time period during which the first device can not be used due to updating of the control program of the first device,
the second time period is a time period until which a second device returns to a normal operating state after the first device has been updated, the second device cooperating with the first device, the second time period including no update time of a control program of the second device, and the first device and the second device belong to an on-vehicle network.

\* \* \* \* \*